United States Patent [19]

Sidlauskas

[11] 3,958,105
[45] May 18, 1976

[54] ELECTRONIC RECOGNITION AND IDENTIFICATION SYSTEM FOR IDENTIFYING SEVERAL MASTER KEYS

[75] Inventor: David P. Sidlauskas, San Jose, Calif.

[73] Assignee: Schlage Electronics, Inc., Sunnyvale, Calif.

[22] Filed: Apr. 10, 1975

[21] Appl. No.: 566,953

[52] U.S. Cl. .................... 235/61.11 H; 340/152 T
[51] Int. Cl.² ........................................ G06K 7/08
[58] Field of Search ............... 235/61.11 H, 61.7 B; 340/152 T, 149 A, 258 C; 343/6.5 SS, 6.8 R

[56] References Cited
UNITED STATES PATENTS

| | | | |
|---|---|---|---|
| 3,671,721 | 6/1972 | Hunn et al. | 235/61.11 H |
| 3,752,960 | 8/1973 | Walton | 235/61.11 H |
| 3,816,708 | 6/1974 | Walton | 235/61.11 H |
| 3,816,709 | 6/1974 | Walton | 235/61.11 H |
| 3,842,246 | 10/1974 | Kohler | 235/61.11 H |

*Primary Examiner*—Daryl W. Cook
*Attorney, Agent, or Firm*—Boone, Schatzel & Hamrick

[57] ABSTRACT

An electronic recognition and identification system for identifying one of a plurality of electrically coded keys, each having at least one tuned electrical circuit which is resonant at at least one of a plurality of predetermined frequencies. The system comprises a sweep oscillator for generating an alternating current signal. The alternating current signal has a frequency which varies with time over a range of frequencies including the plurality of predetermined frequencies. A condition pulse generating network is connected to the oscillator and produces a condition pulse when one of the keys is proximate thereto and when the frequency of the alternating current signal passes through its predetermined frequency. A plurality of reference pulse generating circuits are selectively connected to the oscillator by a sequential multiplexer. Each reference pulse generating circuit is responsive to the alternating current signal and is operative to produce a reference pulse when the frequency of the alternating current signal passes through one of the plurality of predetermined frequencies. A control circuit is responsive to the condition pulses and the reference pulses and is operative to produce a control signal when there is time coincidence between those pulses.

8 Claims, 2 Drawing Figures

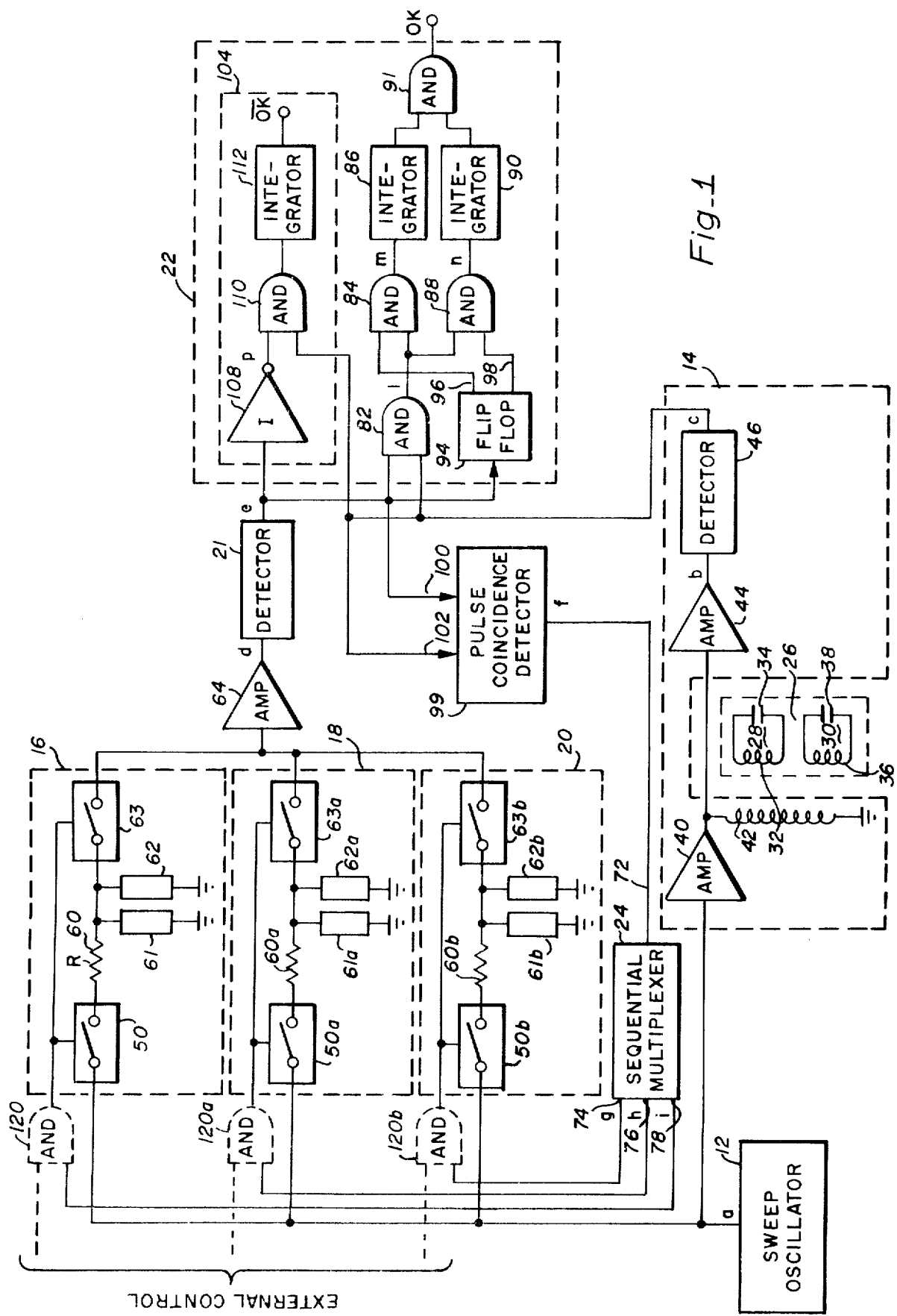
Fig_1

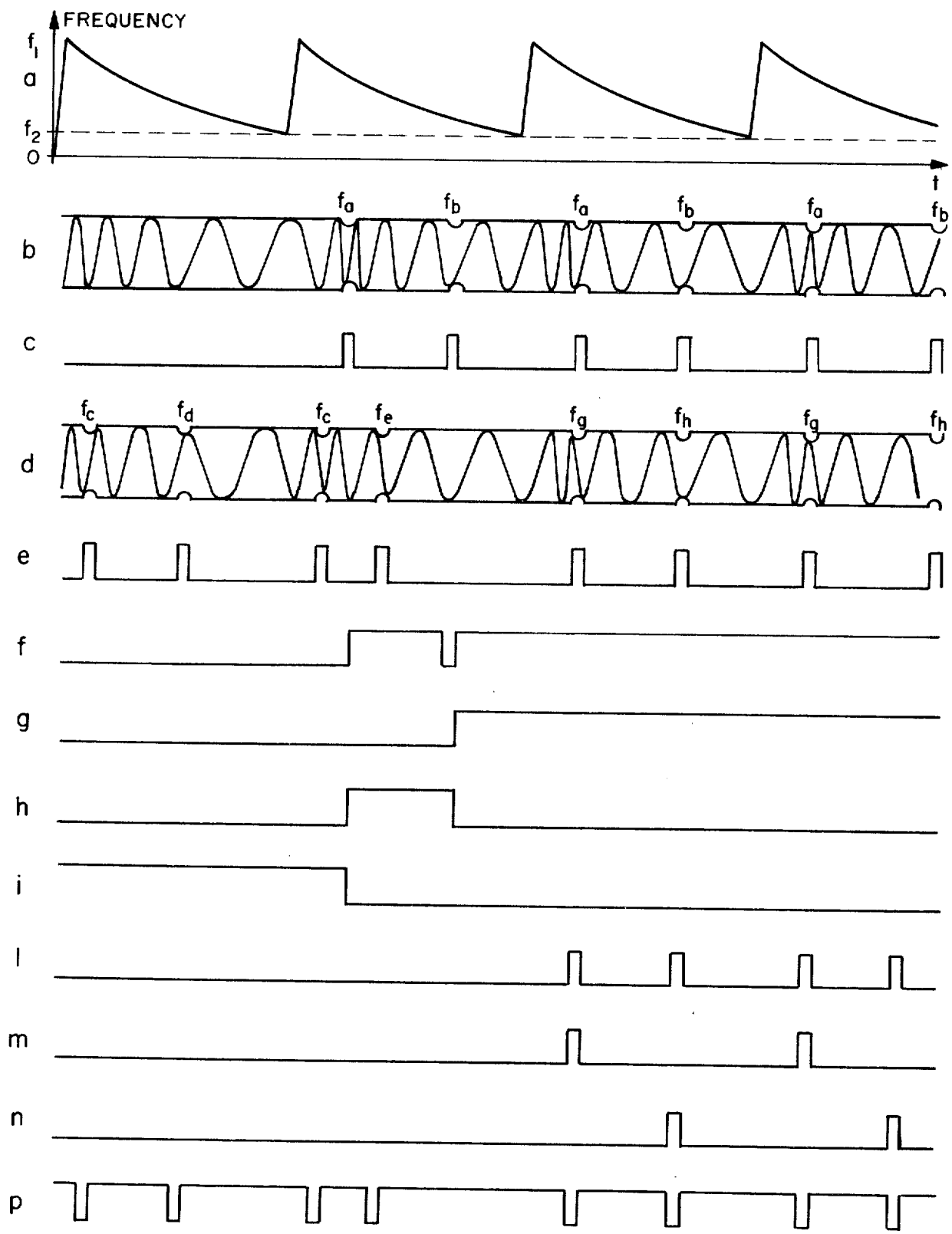
Fig_2

ELECTRONIC RECOGNITION AND IDENTIFICATION SYSTEM FOR IDENTIFYING SEVERAL MASTER KEYS

BACKGROUND OF THE INVENTION

1. Field of the Invention

The present invention relates generally to electronic recognition and identification systems for identifying electrically coded objects and more particularly, to a system including an electrical network adapted to respond to the frequency of coded electrical resonant circuits in the form of master keys.

2. Description of the Prior Art

Electronic recognition and identification systems, such as the common lock and key system, presently exist for performing various functions relative to portal control. For example, an individual may carry an electrically coded identification card (key) for presentation to a reading station when the individual desires to enter into a door. If the card carries an appropriate code, responsive identification control signals are generated which in turn permit the opening of the door.

In another application, an object may carry an identification card electrically coded to identify the object. As the card passes a reading station, the code is read and responsive identification control signals are generated. The identification signals may accordingly be utilized to control associated object processing equipment, or if the object is in transit, the destination of the object.

Examples of prior electronic recognition and identification systems may be found in U.S. Pat. No. 3,752,960, entitled "Electronic Identification and Recognition Systems"; U.S. pat. application entitled "Improved Electronic Recognition and Identification System" filed May 25, 1973, Ser. No. 363,851 by Charles A. Walton and assigned to the assignee of the present application; and U.S. Pat. No. 3,842,246, entitled "Recognition and Identification System with Noise Rejection Capabilities" by Robert D. Kohler, David P. Sidlauskas, and Charles A. Walton, and assigned to the assignee of the present application. U.S. Pat. No. 3,732,465 describes an electronic sensing and actuator system.

SUMMARY OF THE PRESENT INVENTION

It is an object of the present invention to provide a system wherein a limited set of keys, each being characterized as a card having a specific electrical code, can be used to gain entry through an access-controlled door. One of the keys in the set is generally able to open only the subject door and the other keys in the set, designated as master keys, are able to open other doors within the system.

Briefly, the electronic recognition and identification system of the present invention serves to identify any one of a plurality of electrically coded external keys, each having at least one tuned electrical circuit which is resonant at at least one of a plurality of predetermined frequencies. The system comprises a sweep oscillator for generating an alternating current signal. The alternating current signal has a frequency which varies with time over a range of frequencies including the plurality of predetermined frequencies. A condition pulse generation network is connected to the oscillator. The condition pulse generation network is responsive to the alternating current signal and is operative to produce a condition pulse when one of the keys is proximate thereto and when the frequency of the alternating current signal passes through its predetermined frequency. A plurality of reference pulse generating circuits are selectively connected to the oscillator by a sequential multiplexer. Each reference pulse generating circuit is responsive to the alternating current signal and is operative to produce a reference pulse when the frequency of the alternating current signal passes through a respective one of the plurality of predetermined frequencies. A control circuit is responsive to the condition pulses and the reference pulses, and is operative to produce a control signal when there is time coincidence between the condition pulse and one of the plurality of reference pulses.

An advantage of the present invention is that it allows a limited set of electrically coded keys and master keys to be used to gain entry through preselected doors.

The foregoing and other objects, features and advantages of the invention will be apparent from the following detailed description of the preferred embodiment illustrated in the figures of the drawing.

IN THE DRAWING

FIG. 1 is a block circuit diagram illustrating an electronic recognition and identification system in accordance with the present invention; and FIG. 2 is a graphical representation of the wave shapes and time relationships of signals encountered at various points in the system of FIG. 1.

DETAILED DESCRIPTION OF THE PREFERRED EMBODIMENT

FIG. 1 diagrammatically illustrates in block diagram form the recognition and identification system referred to by the reference character 10 and incorporating the teachings of the present invention. The system 10 includes a radio frequency sweep oscillator 12, a condition pulse generation network illustrated in dashed lines and referred to by the reference numeral 14, two or more reference signal generating networks including reference circuits illustrated in dashed lines and referred to by the reference numerals 16, 18 and 20, respectively, a detector 21, a control signal generating means illustrated in dashed lines and referred to by the reference numeral 22, and a sequential multiplexer 24.

A passive card 26 carries one or more, electrically passive tuned inductance-capacitance circuits 28 and 30. Typically, the card 26 is a standard-sized credit card, and is carried by an individual or is attached to an object to be recognized and identified. The circuit 28 includes an inductor 32 and a capacitor 34 electrically interconnected to form a resonant circuit characterized by a resonant frequency $f_1$. The circuit 30 includes an inductor 36 and a capacitor 38 interconnected to form an electrical resonant circuit characterized by a resonant frequency $f_b$. The resonant frequencies of the card 26 may be designated as codes which permit recognition or identification of the particular individual or object to be identified. Hence, the card 26 is said to have two coded resonant frequencies $f_a$ and $f_b$.

The condition pulse generation network 14 is connected to the output terminal of the sweep oscillator 12 and includes an isolation amplifier 40. The output terminal of the isolation amplifier is connected to one terminal of a sensing coil 42 and to an amplifier 44. The other terminal of the sensing coil 42 is connected to ground. The isolation amplifier 40 has a high output impedance and isolates the oscillator 12 from variations in the impedance of coil 42. The output of the amplifier 44 is connected to a detector 46. The detector 46 is responsive to positive and negative amplitude variations, or perturbations in the amplitude of an alternating current signal and is operative to convert each variation which falls below a predetermined threshold to a pulse corresponding to the time occurrence of the variation.

The radio frequency sweep oscillator 12 is also connected to the internal reference signal generating circuits 16–20, each of which is similarly constructed. As shown, the internal reference signal generating circuit 16 includes an electrically operated switch 50 having its input connected to the sweep oscillator 12 and its output connected to one terminal a resistor 60. The other terminal of resistor 60 is connected to one terminal of impedance elements 61 and 62, and an input of an electronically operated switch 63. The other terminal of the impedance elements 61 and 62 is connected to the circuit ground such that the resistor 60 and the elements 61 and 62 form a voltage divider. Impedance elements 61 and 62 are constructed to have an abrupt impedance change at one or more predetermined frequencies. In practice the elements 61 and 62 may be constructed using piezoelectric crystals, tuned inductance-capacitance circuits, or other such resonant elements. The impedance elements 61 and 62 are selected to have abrupt impedance changes at frequencies $f_c$ and $f_d$, respectively. The output of switch 63 is connected to the input of an amplifier 64. The switches 50 and 63 also include control terminals which are connected in common. The internal reference signal generating circuits 18 and 20 are designated by the same numbers as are the similar elements of circuit 16 followed by the letters $a$ and $b$, respectively. The impedance elements 61$a$, 62$a$, 61$b$ and 62$b$ have abrupt impedance changes at frequencies $f_e$, $f_f$, $f_g$ and $f_h$, respectively.

The sequential multiplexer 24 includes an input terminal 72 and output terminals 74, 76 and 78 which are connected to the control terminals of the respective switches 50$b$ and 63$b$, 50$a$ and 63$a$, and 50 and 63. The sequential multiplexer 24 is of the type which applies an output signal sequentially to its output terminals 74 through 78. In particular, application of a positive going signal transition to its input terminal 72, causes the output signal to advance one step, or to sequence to the next output terminal. In the described embodiment, the duration of an output signal from the multiplexer 24 is the same as the interval between applications of an input signal to the terminal 72.

The amplifier 64 has an input terminal connected to the output of switches 63, 63$a$ and 63$b$, respectively, and an output terminal connected to the input of the detector 21. The detector 21 is operative to convert each variation in the amplitude of an alternating current signal applied to its input into a pulse corresponding to the time occurrence of the variation.

The control signal generating means 22 is connected to the output terminals of the detectors 21 and 46. The control means 22 includes a logical AND gate 82. The AND gate 82 is responsive to the relative time position of signals applied to its input terminals and is operative to produce an output signal in the event that there is a time coincidence between the signals. An AND gate 84 has an input terminal connected to the output of the AND gate 82 and an output terminal connected to an integrator 86. The integrator 86 stores the voltage associated with each pulse applied to its input, compares the stored voltage with a predetermined threshold voltage, and produces an electrical signal when the stored voltage exceeds the threshold voltage. Similarly, an AND gate 88, which is similar to the AND gate 84, has an input terminal connected to the output of the AND gate 82 and an output terminal connected to an integrator 90. The integrator 90 is similar in construction and operation to the integrator 86. An AND gate 91 is connected to the integrators 86 and 90, and is of the type which produces an output signal in response to the time coincidence of signals applied to its input terminals.

A flip-flop circuit 94 having two output terminals 96 and 98 is connected to the output of the detector 80. The output terminal 96 is connected to an input of the AND gate 84 and the output terminal 98 is connected to an input of the AND gate 88. The flip-flop circuit 94 is of the type responsive to negative pulse transitions and operative to switch the state of the signals appearing on its output terminals 96 and 98. A pulse coincidence detector 99 has an input terminal 100 connected to the output terminal of the detector 21, and an input terminal 102 connected to the output terminal of the detector 46. An output terminal of the pulse coincidence detector 99 is connected to the input terminal 72 of the sequential multiplexer 24. The pulse coincidence detector 99 is operative to produce an output pulse when an input pulse is applied on the terminal 102 without the application of a corresponding input pulse on the terminal 100. Such output pulse has a leading edge which corresponds in time to the termination of the input pulse on the terminal 102.

The control signal generating means 22 includes a warning network 104 which includes an inverter 108 having its input connected to the detector 21 and its output connected to an AND gate 110. The inverter 108 serves to invert the state of pulses applied to its input. Another input of the AND gate 110 is connected to the output of the detector 46. The output of the AND gate 110 is connected to an integrator 112. The integrator 112 is similar in construction and operation to the integrators 86 and 90.

Referring now to FIG. 2, the waveforms of the signals encountered at various points of the system of the present invention are illustrated for four successive cycles of operation. FIG. 2$a$ illustrates the frequency variation with time of the signal generated by the sweep oscillator 12. As illustrated the frequency continuously changes from $f_1$ to $f_2$ during each sweep cycle and is repetitive during each successive sweep cycle. FIG. 2$b$ illustrates the waveform of the signal developed across the coil 42 with the key 26 absent and present. During the first sweep cycle, FIG. 2$b$ illustrates the external key 26 as not being within the sensing field of the coil. Successive sweep cycles of FIG. 2$b$ illustrate presence of the key and illustrate perturbations corresponding to the resonant frequencies $f_a$ and $f_b$ of the tuned circuits 28 and 30, respectively.

FIG. 2$c$ illustrates the waveform of the condition pulse signal produced at the output of the detector 46 with condition pulses corresponding in time to the resonant frequencies $f_a$ and $f_b$. FIG. 2$d$ illustrates the output waveform of the amplifier 64 and includes perturbations which correspond in time to the abrupt frequency changes of the corresponding impedance elements. FIG. 2$e$ illustrates the waveform of the reference pulse signal produced at the output of the detector 21. FIG. 2f illustrates the output of the pulse coincidence detector 99. When a condition signal pulse does not correspond to a reference signal pulse, the output of the pulse coincidence detector 99 makes a negative-to-positive transition in voltage. FIGS. 2g, 2h and 2i illustrate the output waveforms at the terminals 74, 76 and 78, respectively, of the sequential multiplexer 24.

In operation, the radio frequency sweep oscillator 12 is energized so as to provide an alternating current sweep signal having a frequency that varies with time between $f_1$ and $f_2$. This alternating current signal is applied to the amplifier 40 and to the input terminals of the switches 50, 50a, and 50b. In the preferred embodiment the oscillator 12 sweeps repetitively from a frequency of 16 mHz to a frequency of 4 mHz. The sweep signal is amplified by the amplifier 40 and applied to the sensing coil 42 which, by transformer action, generates an electromagnetic field within an exterior sensing zone proximate to the coil. As the coded card 26 is moved into the sensing zone, the coils 32 and 36 function as a secondary of the transformer and the electromagnetic field inductively couples the resonant circuits 28 and 30, respectively, to the sensing coil 42. Accordingly, the load and resonances of the circuits 28 and 30 are reflected across the sensing coil 42 which decreases the amplitude of the potential developed across the sensing coil at frequencies coinciding with the resonant frequencies $f_a$ and $f_b$, as shown in FIG. 2b. These amplitude perturbations repeatedly occur as the sweep signal passes through the resonant frequencies provided that the card 26 is within the sensing zone.

The reflected signal is thereafter amplified by the amplifier 44 and applied to the detector 46. The detector 46 is responsive to the potential developed across the sensing coil 42 and produces a condition pulse each time the potential drops below a predetermined threshold. The condition pulse signal is illustrated in FIG. 2c. Thus, the time occurrence of the condition pulses represent the frequencies of the sweep signal which correspond to the resonant frequencies $f_a$ and $f_b$ of the passive circuit 26.

The sequential multiplexer 24 produces pulses illustrated in FIGS. 2g, 2h and 2i to control the sequential operation of the switches 50b and 63b, 50a and 63a, and 50 and 63, respectively. In a manner which will be subsequently described, the multiplexer 24 is caused to advance in sequence by application of a positive going transition to its input terminal 72.

As illustrated in FIG. 2i, the sequential multiplexer 24 initially applies a pulse on the terminal 78 that causes the switches 50 and 63 to close. With those switches closed, the output of the sweep oscillator is applied to the voltage divider formed by the resistor 60 and the impedance elements 61 and 62. The voltage developed across the elements 61 and 62 of this voltage divider is thus applied through the closed switch 63 and amplified by the amplifier 64. As the frequency of the sweep oscillator 12 passes through $f_c$ and $f_d$, the impedance of the impedance elements 61 and 62 abruptly changes, thus, producing a variation in the potential developed at the output of the amplifier 64 (see FIG. 2d). The detector 21 converts this variation in potential to the reference pulse signal illustrated in FIG. 2e.

Since the condition pulse signal of FIG. 2c and the reference pulse signal of FIG. 2e are applied to the AND gate 82 and since there is no time coincidence between the signals, no signal will be produced at the output terminal of the AND gate 82. It should be recognized if an external key is not present, as illustrated in FIG. 2c, during the first sweep cycle of operation, condition pulses are not produced.

During the second and succeeding sweep cycles of operation, the external key 26 is positioned within the sensing zone proximate to the sensing coil 42. Thus, the condition pulse signal shown in FIG. 2c is produced at the output of the detector 46 and applied to the input terminal 102 of the pulse coincidence detector 99. It should be noted that during the second sweep cycle, the first condition pulse is not coincident with a reference pulse. Hence, at the termination of the first condition pulse, the output potential of the pulse coincidence detector 99 rises as illustrated in FIG. 2f. This positive going transition causes the sequential multiplexer 24 to advance, thus removing the output signal from terminal 78 and applying the signal on terminal 76. This causes switches 50 and 63 to open and switches 50a and 63a to close. With the switches 50a and 63a closed the reference signal generating circuit 18 is operative to produce a reference pulse corresponding in time to the frequency $f_c$ as illustrated in FIGS. 2d and 2e.

When the frequency of the output signal of the sweep oscillator 12 again passes through the resonant frequency $f_b$ of key card 26, a condition pulse is produced at the output of the detector 46. Since the condition pulse is not coincident with the reference pulse, the AND gate 82 does not conduct and the sequential multiplexer 24 is advanced in the manner previously described. Thus, its output signal is removed from terminal 76, making signal generating circuit 18 inoperative, and applied to terminal 74, making reference signal generating circuit 20 operative.

During the third cycle of sweep oscillator operation, a condition pulse is produced as the frequency of the output signal of the sweep oscillator 12 passes through $f_a$, and a reference pulse, corresponding in time to the frequency $f_a$, is produced by the reference signal generating circuit 20. Since the frequencies $f_a$ and $f_a$ are identical, the condition pulse and the reference pulse are time coincident and the pulse coincident detector 99 remains high. Accordingly, the sequential multiplexer 24 does not advance and the reference signal generating circuit 20 remains operative.

In a like manner, since the frequencies $f_b$ and $f_h$ are identical, when the frequency of the output signal of the sweep oscillator 12 passes through $f_b$, a condition pulse is produced corresponding in time to $f_b$ and a reference pulse is produced corresponding in time to $f_h$. Since these two pulses are time coincident, the pulse coincidence detector 99 remains high, the sequential multiplexer 24 does not advance and the reference signal generating circuit 20 remains operative. This condition is maintained as long as the condition pulses are coincident with the reference pulses.

In addition to being applied to the pulse coincidence detector 99, the reference pulse signal and the condition pulse signal are applied to the AND gate 82. Since, during the third sweep cycle there is time coincidence between the reference and condition pulses, the AND gate conducts as illustrated in FIG. 21. Furthermore, each negative going transition of the reference pulse is operative to cause the flip-flop 94 to change state. Because the output terminals 96 and 98 of the flip-flop 94 are connected to an input of AND gates 84 and 88, respectively, the AND gates 84 and 88 are enabled on alternate reference pulses. Consequently, the pulses conducted through the AND gate 82 are steered through the AND gates 84 and 88 by the alternative enabling action of flip-flop 94 as previously described, and accumulated by integrators 86 and 90, respectively.

Each additional pulse is conducted through each AND gate 84 and 88 to the integrators 86 and 90, as illustrated in FIGS. 2*m* and 2*n*. In the preferred embodiment, after four pulses have been applied to the integrators 86 and 90, the voltage stored in the integrators exceeds the threshold voltage, thereby causing the integrators 86 and 90 to conduct. Due to the time coincidence of conduction, the AND gate 91 is rendered conductive thereby producing a control, or an OK output, signal for use in controlling the operation of an associated door (not shown).

Referring now to the warning circuit 104 illustrated in FIG. 1, it should be noted that the pulses produced by the detector 21 are applied to the inverter 108. The inverted pulses thus produced, as illustrated in FIG. 2*p*, are the inverse of the signal illustrated in FIG. 2*e*. The inverted pulses and the output of the detector 46 are applied to the AND gate 110. Accordingly, if an incorrect key, having resonant frequencies which do not correspond to those of the reference signal circuits 16, 18 or 20 is positioned in the external sensing zone, proximate to the sensing coil 42, signals are produced at the output of the AND gate 110. In a manner similar to that described during the operation of the integrators 86 and 90, after several successive frequency sweeps, the integrator 112 stores a voltage. When this voltage exceeds the threshold voltage applied to the integrator 112, a warning signal designated as an $\overline{OK}$ (not OK) signal in FIG. 1 is produced. The warning signal indicates that an improper identification tag is carried by the object or that someone bearing an unacceptable identification card is attempting to enter the door. Typically, the warning signal is in the form of a red light or a warning buzzer.

It should be recognized that if the passive card 26 placed proximate to the sensing coil 42 is characterized by only one of any pair of the reference frequencies, then one of the integrators 86 and 90 would never receive pulses and thus a control signal would never be generated by the AND gate 91.

The overall system effect is that when an electrically coded key associated with a certain door is presented to that door, the bearer gains admission. Moreover, if either of two master keys is presented the door, the bearers of those master keys also gain admission. However, if a wrong key, or a key coded with frequencies not found elsewhere in the system, is presented to the door, admission is not gained and a warning signal is emitted.

In an alternative embodiment of the present invention, AND gates 120, 120*a* and 120*b* (shown in dashed lines in FIG. 1) are connected between the terminals 78, 76 and 74 and the reference signal generating circuits 16, 18 and 20, respectively. An input terminal of each of the AND gates 120, 120*a* and 120*b* is connected to respective power sources for producing gate-enabling external control signals. Typically, the power sources are batteries which are selectively energized to produce continuous direct current signals during preselected hours of a day. Accordingly, the AND gates 120, 120*a* and 120*b* serve to inhibit operation of the respective reference signal generating circuits 16, 18 and 20 during predetermined time periods. This embodiment may be employed to prevent the holders of certain master keys from entering buildings during off-hours.

While the invention has been particularly shown and described with reference to a certain preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. An electronic recognition and identification system for identifying one of a plurality of electrically coded passive objects each having at least one tuned electrical circuit which is resonant at at least one of a plurality of predetermined frequencies, comprising:

signal source means for generating an alternating current signal, said alternating current signal having a frequency which varies with time over a range of frequencies including said plurality of predetermined frequencies;

a condition pulse generation network connected to said signal source means, said condition pulse generation network being responsive to said alternating current signal and operative to produce a condition pulse when one of the objects is proximate thereto and when the frequency of said alternating current signal passes through its predetermined frequency;

a plurality of reference pulse generating means each responsive to said alternating current signal and operative to produce a reference pulse when the frequency of said alternating current signal passes through a respective one of said plurality of predetermined frequencies;

means for selectively applying said alternating current signal to said plurality of reference pulse generating means; and control signal generating means responsive to said condition pulses and said reference pulses and operative to produce a control signal when there is time coincidence between said condition pulse and one of said plurality of reference pulses thereby identifying the proximate object.

2. An electronic recognition and identification system as recited in claim 1 wherein said means for selectively applying said alternating current signal includes a sequential multiplexer connected to each said reference pulse generating means for generating a sequential signal, which is sequentially applied to said plurality of reference signal generating means.

3. An electronic recognition and identification system as recited in claim 2 including a pulse coincidence detector responsive to said condition pulses and said reference pulses and operative to selectively control the application of said sequential signal.

4. An electronic recognition and identification system as recited in claim 1 and further including warning means responsive to said condition pulse and said reference pulse and operative to provude a warning signal in the event that there is not time coincidence between said condition pulse and one of said plurality of reference pulses.

5. An electronic recognition and identification system as recited in claim 4 wherein said warning means includes an inverter for inverting said reference pulse, and time position comparator means responsive to said inverted reference pulse and said condition pulse and operative to produce said warning signal.

6. An electronic recognition and identification system as recited in claim 1 wherein said condition pulse generation network includes a condition sensing coil for providing an electromagnetic field within an external zone when energized by an alternating current signal such that when one of the passive objects is brought within the external zone the object is inductively coupled to said condition sensing coil by said electromagnetic field and loads said condition sensing coil when the frequency of said alternating current signal passes through said predetermined frequency and such that the potential developed across said condition sensing coil is changed during the passage of said predetermined frequency, and condition detector means responsive to the potential developed across said condition sensing coil and operative to produce said condition pulse each time said potential drops below a predetermined threshold.

7. An electronic recognition and identification system as recited in claim 1 wherein each of said plurality of reference pulse generating means includes an impedance element having an impedance which changes at a preselected frequency such that when said impedance element is energized by an alternating current signal the potential developed across said impedance element is changed during the passage of said predetermined frequency, and reference detector means responsive to the potential developed across said impedance element and operative to produce said reference pulse each time said potential drops below a predetermined threshold.

8. An electronic recognition and identification system as recited in claim 1 wherein each of said plurality of reference pulse generating means includes inhibitor means responsive to said sequential signal and an external control signal and operative to inhibit operation of said respective reference pulse generating means when said external control signal is not present.

* * * * *